(12) United States Patent
Luangrath et al.

(10) Patent No.: US 12,283,840 B2
(45) Date of Patent: Apr. 22, 2025

(54) PORTABLE SOLAR BATTERY CHARGING

(71) Applicant: Inergy Holdings, LLC, Chubbuck, ID (US)

(72) Inventors: Sean Luangrath, Highland, UT (US); Zachary Blume, Orem, UT (US)

(73) Assignee: INERGY HOLDINGS, LLC, Chubbuck, ID (US)

( * ) Notice: Subject to any disclaimer, the term of this patent is extended or adjusted under 35 U.S.C. 154(b) by 743 days.

(21) Appl. No.: 17/337,399

(22) Filed: Jun. 2, 2021

(65) Prior Publication Data

US 2021/0376652 A1    Dec. 2, 2021

Related U.S. Application Data

(60) Provisional application No. 63/033,646, filed on Jun. 2, 2020.

(51) Int. Cl.
| | | |
|---|---|---|
| *H02J 7/00* | (2006.01) | |
| *H01R 33/945* | (2006.01) | |
| *H02J 7/35* | (2006.01) | |
| *H01R 13/627* | (2006.01) | |
| *H01R 13/629* | (2006.01) | |

(52) U.S. Cl.
CPC ............. *H02J 7/35* (2013.01); *H01R 33/945* (2013.01); *H02J 7/00032* (2020.01); *H02J 7/0045* (2013.01); *H02J 7/0048* (2020.01); *H02J 7/007182* (2020.01); *H01R 13/6275* (2013.01); *H01R 13/629* (2013.01); *H02J 2207/20* (2020.01)

(58) Field of Classification Search
CPC .................................. H02J 7/00032
USPC ........................................... 320/101
See application file for complete search history.

(56) References Cited

U.S. PATENT DOCUMENTS

| | | | |
|---|---|---|---|
| 9,236,751 B2 * | 1/2016 | Goei | H02S 30/20 |
| 2012/0146572 A1 * | 6/2012 | Ward | B60L 8/003 |
| | | | 320/101 |
| 2012/0299529 A1 * | 11/2012 | Guo | H02J 7/35 |
| | | | 320/101 |
| 2019/0036359 A1 * | 1/2019 | Smith | H02J 7/02 |
| 2019/0133303 A1 * | 5/2019 | Thiel | H02J 7/34 |
| 2019/0137056 A1 * | 5/2019 | Sreshta | H05B 47/19 |

FOREIGN PATENT DOCUMENTS

WO    WO-2020080811 A1 *    4/2020    ............... H02J 1/10

* cited by examiner

*Primary Examiner* — Yalkew Fantu
(74) *Attorney, Agent, or Firm* — Kunzler Bean & Adamson (57) ABSTRACT

Apparatuses, systems, and methods are disclosed for solar-powered battery charging. In a solar battery pack, one or more solar panels may be coupled to a foldable housing. A battery is also coupled to the housing. Charge control circuitry is electrically coupled to the solar panels and the battery. The charge control circuitry is configured to control power flow from the solar panels to the battery based on one or more predetermined characteristics of the solar panels.

18 Claims, 7 Drawing Sheets

PORTABLE SOLAR BATTERY CHARGING

CROSS-REFERENCES TO RELATED APPLICATIONS

This application claims the benefit of U.S. Provisional Patent Application No. 63/033,646 entitled "MOBILE PHONE CHARGING SYSTEM" and filed on Jun. 2, 2020 for Sean Luangrath, which is incorporated herein by reference.

FIELD

This invention relates to battery charging and more particularly relates to portable apparatuses and systems for solar-powered battery charging.

BACKGROUND

More than 1.1 billion people lack access to electricity. This fraction of the global population is off-grid and is referred to as the base of the socioeconomic pyramid. The "base of the pyramid" includes more than 4 billion people that spend up to 30% of household income on expensive batteries and low-quality, dangerous fuel-based sources of light, such as kerosene, to meet their energy needs. Families in these households inhale toxic kerosene fumes on a nightly basis. Moreover, children struggle to study because they rely on using dim kerosene light.

Many off-grid households in these markets own cellular phones that are commonly referred to as "feature phones", which offer basic voice and text features. Off-grid "base of the pyramid" individuals may travel hours to charge their consumer electronics, such as cellular phones, from the nearest source of grid electricity, often paying very high direct and indirect fees to do so.

Access to mobile phones plays a key part in poverty reduction; however mobile phones consume power when operational. A basic feature phone (voice and text only) may last 3 or 4 days on standby, or even less than a day if it is heavily used. The battery in the "dead" phone then has to be recharged, to enable the phone to be used again.

According to the World Bank, there are over 1.6 billion people who do not have direct access to electricity to charge mobile phones in Sub-Sahara Africa and South Asia. Those people who are able to afford a basic feature phone may pay for public transportation or spend up to 6 hours a week walking to other villages to find electricity to charge their phones, or they may pay local businessmen offering charging services to connect their phones to chargers connected to car batteries. Phones with "dead batteries" are typically left at a phone charging business for 1 to 3 days when arrangements can be made to retrieve the fully charged phones. Not having their phones for 1 to 3 days results in loss of productivity and means of conducting business or communicating with friends and family.

SUMMARY

Apparatuses are disclosed for solar-powered battery charging. In some embodiments, two solar panels are coupled to a foldable housing. In some embodiments, a single cell battery is coupled to the housing. In some embodiments, charge control circuitry is electrically coupled to the solar panels and the battery. In some embodiments, the charge control circuitry is configured to control power flow from the solar panels to the battery based on one or more predetermined characteristics of the solar panels.

In some embodiments, the charge control circuitry includes a DC-to-DC power converter to step down a voltage from the solar panels to a voltage for charging the battery. In some embodiments, the charge control circuitry includes an application-specific integrated circuit configured to control the DC-to-DC power converter based on the one or more predetermined characteristics of the solar panels.

In some embodiments, a combined nominal power of the solar panels is less than five watts. In some embodiments, an output voltage for the single-cell battery is less than five volts. In some embodiments, a supply voltage for the charge control circuitry is higher than an output voltage of the battery, and the charge control circuitry is solely powered by the solar panels.

In some embodiments, the charge control circuitry includes first input circuitry for charging the battery from the solar panels, and second input circuitry for charging the battery from an external power source. In some embodiments, the charge control circuitry is configured to control the first input circuitry and the second input circuitry to charge the battery using the solar panels and the external power source simultaneously.

In some embodiments, the charge control circuitry is configured to limit an output current for the solar panels in response to an output voltage for the solar panels failing to satisfy a threshold. In some embodiments, the threshold is based on the one or more predetermined characteristics of the solar panels.

In some embodiments, an apparatus includes one or more output connectors, and output circuitry that controls power flow from the battery through the one or more output connectors. In some embodiments, the output circuitry is capable of delivering power from the battery through the one or more output connectors while the battery is being charged.

In some embodiments, an apparatus includes a charging station separate from the housing station. In some embodiments, a charging station includes a solar panel for the charging station, and a quick charge controller with multiple power outputs. In some embodiments, the charge control circuitry includes quick charge input circuitry for charging the battery from the quick charge controller of the charging station. In some embodiments, the nominal power for the solar panel for the charging station is at least one hundred watts.

Systems are disclosed for solar-powered battery charging. A system, in some embodiments, includes a charging station and a plurality of solar battery packs. A charging station, in some embodiments, includes a solar panel for the charging station, and a quick charge controller with multiple power outlets. In some embodiments, each of the solar battery packs includes at least one solar panel smaller than the solar panel for the charging station and coupled to a foldable housing, a battery coupled to the housing, and charge control circuitry electrically coupled to the at least one solar panel and the battery. In some embodiments, the charge control circuitry includes first input circuitry for charging the battery from the at least one solar panel, and second input circuitry for charging the battery from a power outlet of the multiple power outlets.

In some embodiments, the charge control circuitry is configured to control the first input circuitry and the second input circuitry to charge the battery using the at least one solar panel and the power outlet simultaneously. In some embodiments, the charge control circuitry is configured to control power flow from the at least one solar panel to the battery based on one or more predetermined characteristics of the at least one solar panel. In some embodiments, the quick charge controller is configured to control power flow from the solar panel for the charging station to the multiple power outlets based on power point tracking of the solar panel for the charging station.

In some embodiments, the quick charge controller is coupled to the back of the solar panel for the charging station, for moving the charging station as a single, portable unit. In some embodiments, the quick charge controller includes monitoring circuitry configured to monitor illumination of the solar panel for the charging station; and communication circuitry configured to present information to a user to facilitate positioning the solar panel for the charging station based on the illumination. In some embodiments, the quick charge controller includes communication circuitry configured to determine state of charge information for solar battery packs connected to the power outlets, and to present the state of charge information to a user.

Methods are disclosed for solar-powered battery charging. A method, in some embodiments, includes providing a charging station that includes a solar panel for the charging station, and a quick charge controller with multiple power outlets. A method, in some embodiments, includes providing a solar battery pack that includes at least one solar panel smaller than the solar panel for the charging station and coupled to a foldable housing, a battery coupled to the housing, and charge control circuitry for charging the battery. A method, in some embodiments, includes connecting the solar battery pack to a power outlet of the multiple power outlets. A method, in some embodiments, includes charging the battery from the power outlet and the at least one solar panel simultaneously. A method, in some embodiments, includes disconnecting the solar battery pack from the charging station. A method, in some embodiments, includes using the solar battery pack to power a portable electronic device. A method, in some embodiments, includes recharging the solar battery pack using the at least one solar panel while the solar battery pack is disconnected from the charging station.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an electrically erasable programmable read-only memory ("EEPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain examples, may alternatively be embodied by or implemented as a component.

A circuit, or circuitry, as used herein, comprises a set of one or more electrical and/or electronic components providing one or more pathways for electrical current. In certain examples, circuitry may include a return pathway for electrical current, so that a circuit is a closed loop. In some examples, however, a set of components that does not include a return pathway for electrical current may be referred to as a circuit or as circuitry (e.g., an open loop). For example, an integrated circuit may be referred to as a circuit or as circuitry regardless of whether the integrated circuit is coupled to ground (as a return pathway for electrical current) or not. In various examples, circuitry may include an integrated circuit, a portion of an integrated circuit, a set of integrated circuits, a set of non-integrated electrical and/or electrical components with or without integrated circuit devices, or the like. In one or more examples, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain example, may be embodied by or implemented as a circuit.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Figure 1:
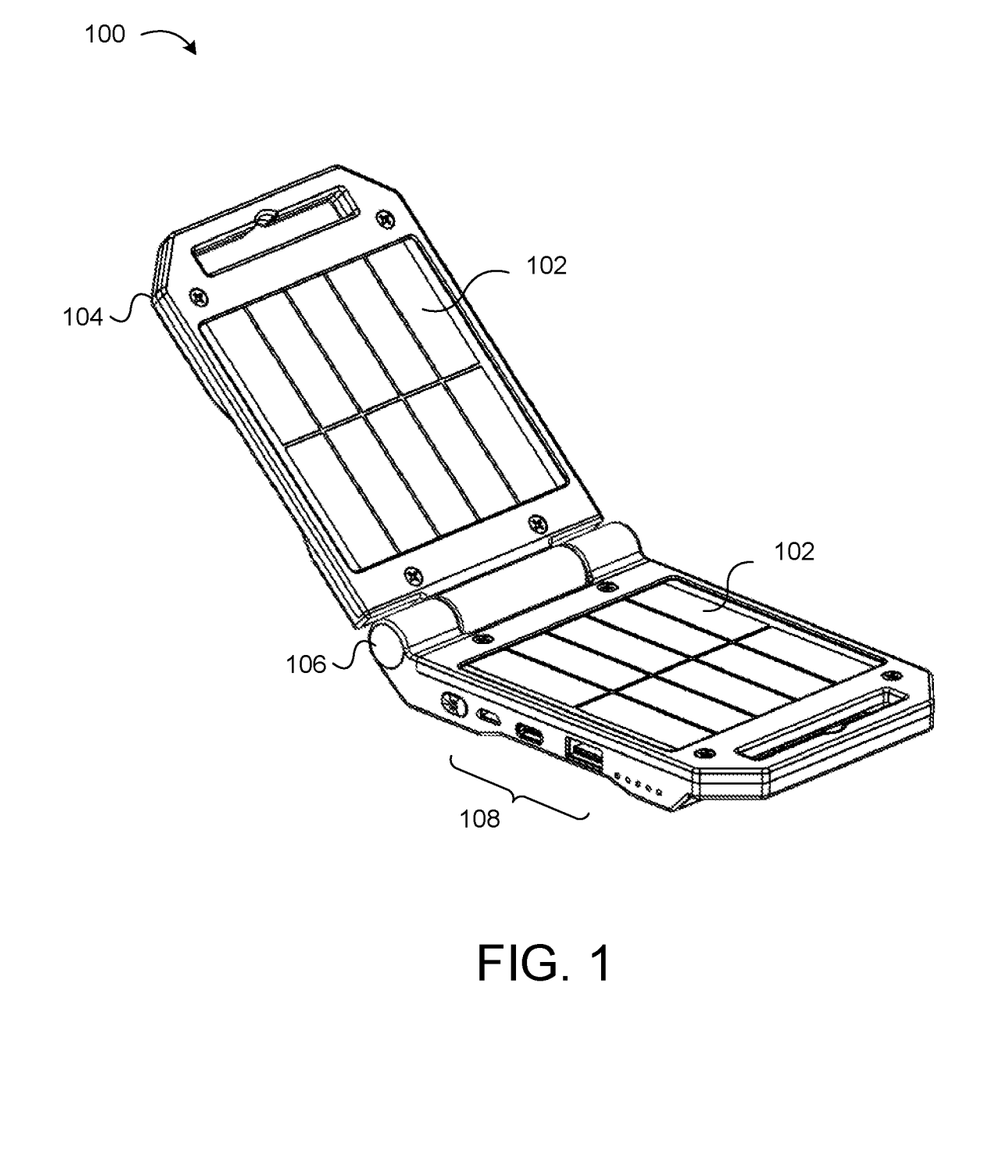
FIG. 1 is a perspective view illustrating one embodiment of an apparatus for solar-powered battery charging.

FIG. 1 depicts an apparatus 100 for solar-powered battery charging, in one embodiment. The apparatus 100 in the depicted embodiment includes a foldable housing 104, shown in an unfolded state.

In the depicted embodiment, the apparatus 100 is a solar battery pack. The term solar battery pack, as used herein, may refer to any apparatus that includes at least one solar panel 102 and a battery (not visible in FIG. 1) that can be charged via the at least one solar panel. In general, a battery pack provides a rechargeable battery that can be repeatedly charged to power or recharge other devices, such as cellular phones, tablet computers, light-emitting diode ("LED") lights, and the like. A solar battery pack such as the apparatus 100, in various embodiments, is a battery pack that includes one or more solar panels 102 for recharging the battery. In some embodiments, a solar battery pack such as the apparatus 100 may also be capable of charging the battery from a power source other than the solar panels if an external power source is available. However, in various embodiments, providing solar panels 102 to charge a battery may allow the apparatus 100 to be used "off-grid" for extended periods of time without relying on an external power source to recharge the battery.

In the depicted embodiment, the apparatus 100 includes two solar panels 102, coupled to a foldable housing 104. A solar panel 102, in various embodiments, may include one or more photovoltaic cells capable of generating electricity from light energy. Thus, the term "solar panel" as used herein may refer to a single photovoltaic cell, a solar module comprising a plurality of photovoltaic cells, a plurality of solar modules connected to form a single unit, or the like. Although two solar panels 102 are included in the depicted embodiment, some embodiments of an apparatus 100 may include more or fewer than two solar panels 102 (e.g., depending on desired power generation capacity). Solar panels 102 may be coupled to a housing 104 in various ways, including via an adhesive, fasteners, brackets, a face panel or bezel of the housing 104 to retain the solar panels 102, or the like.

In various embodiments, an apparatus 100 may include various types of solar panels 102, known or yet to be discovered. Solar panels 102 may be commercially available from a variety of sources. In one embodiment, an apparatus 100 may include high-efficiency solar panels 102, such as solar panels available under the SUNPOWER trademark.

In some embodiments, a solar panel 102 may have a nominal power, also referred to as a nameplate capacity, which is a power output measured under standard test conditions. For example, standard test conditions specified in standards such as IEC 61215, IEC 61646 and UL 1703 may include a temperature of 25 degrees Celsius, light intensity of 1000 watts per square meter, and a particular spectrum of light. The peak power output measured under these test conditions while varying a resistive load may be the nominal power or nameplate capacity of the solar panel.

In the depicted embodiment, the solar panels 102 are 1.5 watt solar panels, meaning that they both have a nominal power rating of 1.5 watts, for a combined nominal power of 3 watts. In some embodiments, one or more solar panels 102 for an apparatus 100 may have a total or combined nominal power of five watts, less than five watts, four watts or less, three watts or less, two watts or less, or the like. In general, size of the solar panels 102 correlates with power output, and the size of the apparatus 100 may reflect a tradeoff or balance between power output and portability. In the depicted embodiment, the use of high-efficiency 1.5 watt solar panels 102 allows the apparatus 100 to be sized so that it can be conveniently handheld, transported with other items or devices in a backpack, purse or other container, and the like. The apparatus 100 in some embodiments may be approximately the size of a smartphone, larger than a smartphone but smaller than a tablet computer, approximately the size of a tablet computer, or the like. In various further embodiments, apparatuses 100 of various further sizes and power ratings may be provided, reflecting different tradeoffs between portability and power generation.

A housing 104, in various embodiments, may provide structural support for solar panels 102 and other components of a solar battery pack, and may enclose one or more internal components, such as a battery, charge control circuitry for charging the battery from the solar panels 102 and/or an external power source, output circuitry for powering external devices using the battery, or the like. In the depicted embodiment, the housing 104 is foldable, and includes a hinge 106 or other folding mechanism allowing opposite sides of the housing to be folded together. An apparatus 100 including a foldable housing may be unfolded (as shown in FIG. 1) to expose the solar panels 102 to a light source, or may be folded for transport. A user may fold the apparatus 100 so that the solar panels 102 face each other, which may make the apparatus 100 compact for easy transportation and may also protect the solar panels 102 from being damaged during transportation.

In another embodiment, however, a solar battery pack may not be foldable, and may include one or more solar panels 102 coupled to a non-foldable or flat housing. For example, although FIG. 1 depicts two solar panels 102 on either side of the hinge 106, omitting the hinge 106 may allow a larger solar panel to be used across a greater surface area of the apparatus 100 (e.g., with solar panel 102 covering where the hinge 106 would have been), thus increasing power generation capacity by omitting the portability and durability benefits of the foldable housing 104.

A housing 104 and a hinge 106, in various embodiments, may be made from materials such as plastic, fiber-reinforced plastic, metal, or the like, which may be molded, stamped, or otherwise formed. Apparatuses 100, in various embodiments, may include various types of hinges 106 and housings 104, made of various types of materials and formed and/or coupled together in various ways.

The apparatus 100, in the depicted embodiment, includes one or more ports 108. In various embodiments, one or ports 108 may include at least one output connector for power output. A portable electronic device such as a cellular phone may be connected to an output connector and powered or recharged by the solar battery pack. In some embodiments, one or more ports 108 may include an input connector, allowing the battery of the apparatus 100 to be charged from an external power source instead of, or in addition to charging the battery from the solar panels 102.

In the depicted embodiment, the ports 108 are Universal Serial Bus ("USB") ports, including a USB-A port for power output to other devices, a Micro USB port for power input from an external power source, and a USB-C port for power output and/or input. In another embodiment, an apparatus 100 may include more or fewer ports 108, or different types of ports such as non-USB ports, or the like. Ports 108, in the depicted embodiment, are disposed on one side of the housing 104. In some embodiments, ports 108 may be disposed on multiple sides of the housing 104, on the back of the housing 104, or the like.

Figure 2:
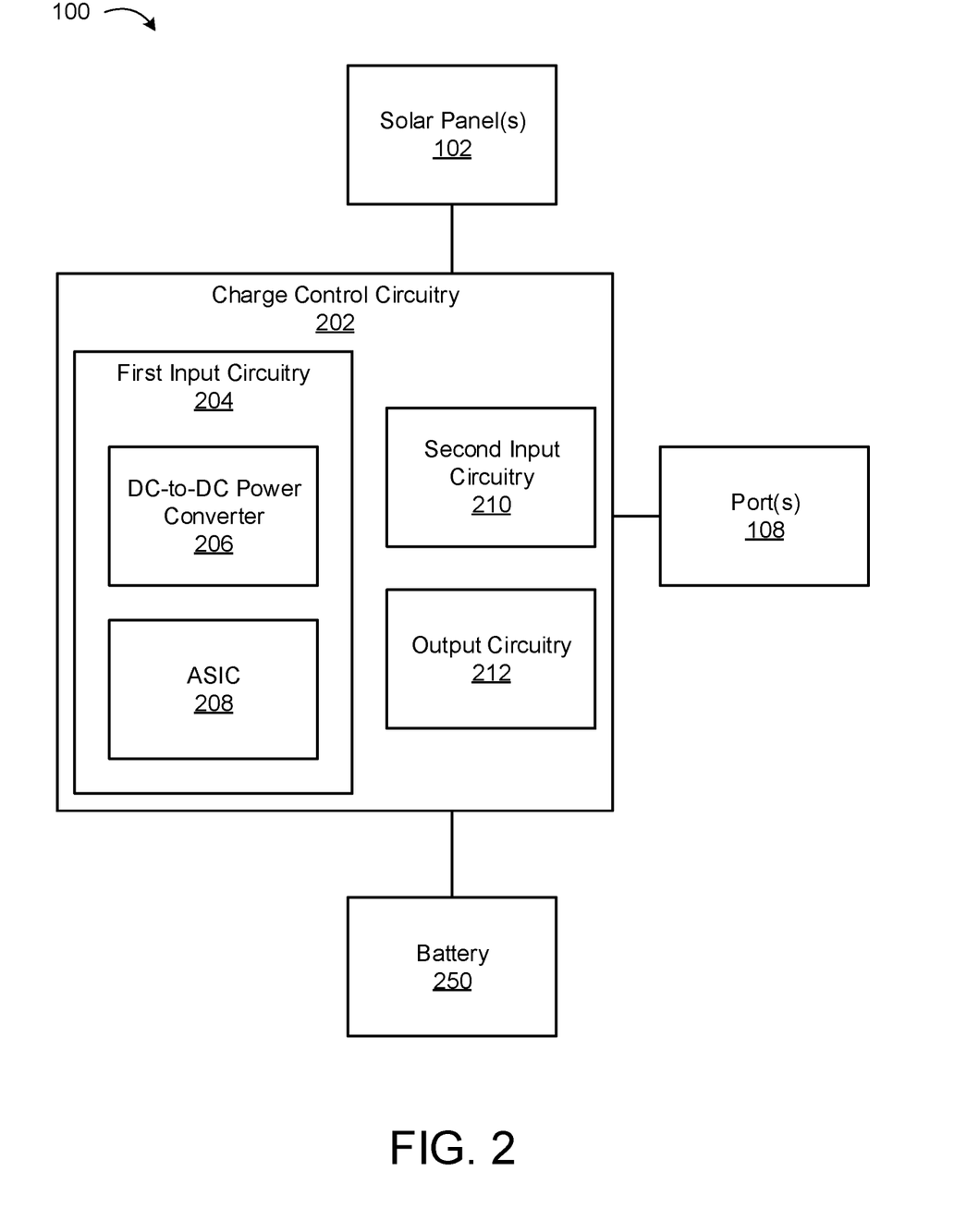
FIG. 2 is a schematic block diagram further illustrating components of an apparatus for solar-powered battery charging.

Various internal components of the apparatus 100 are not visible in FIG. 1, but are discussed below with reference to FIG. 2. FIG. 2 is a schematic block diagram illustrating components of an apparatus 100 for solar-powered battery charging, which may be substantially as described above, including one or more solar panels 102 coupled to a housing 104 with one or more ports 108 for power output and/or additional power input. In the depicted embodiment, the apparatus 100 further includes charge control circuitry 202 and a battery 250, which are described below.

A battery 250, in various embodiments, is coupled to and/or enclosed by the housing 104. The battery 250, in the depicted embodiment, is a rechargeable battery capable of producing electrical power to power a load while discharging the battery, and capable of consuming electrical power from a power source to recharge the battery. A battery 250, in various embodiments, may include one or more electrochemical cells that produce electrical power from a chemical reaction (or, during recharging, that consume electrical power to reverse the reaction). Although the term "battery" is sometimes used in other literature in a limiting sense to refer to a device with multiple electrochemical cells, the term as used herein is not thus limited, and may refer to multiple-cell device or to a single-cell device with one electrochemical cell.

In some embodiments, the battery 250 is a single-cell battery. In some embodiments, the battery 250 may include multiple cells. In various embodiments, a rechargeable battery 250 may be a lithium-ion battery, a lithium iron phosphate battery, a lithium polymer battery, or another type of battery. Various other or further types of rechargeable batteries with various battery chemistries, form factors, or other chemical or mechanical variations may be suitable for use in an apparatus 100. In the depicted embodiment, the battery 250 is a 6,000 milliamp-hour (mAh) lithium-ion battery 250, capable of charging multiple other devices (such as phones) multiple times. In another embodiment, a battery 250 may have a capacity greater or lesser than 6,000 mAh.

A single-cell lithium-ion battery, in one embodiment, may have a nominal or average output voltage of approximately 3.6 to 3.8 volts, and may be operated with actual open-circuit output voltages in a range from approximately 3.0 volts for a fully discharged battery to 4.2 volts for a fully charged battery. Variations in battery materials and manufacturing may provide larger, smaller, or shifted operable voltage ranges for a battery 250. Nevertheless, various types of single-cell battery 250 may have an output voltage (e.g., an actual voltage under load, an open-circuit voltage, or the like) less than five volts, less than 4.5 volts, less than 4 volts, or the like. Multiple-cell batteries in some embodiments may provide higher output voltages by coupling individual cells in series, but at the expense of greater complexity and weight.

The charge control circuitry 202, in the depicted embodiment, is electrically coupled to the solar panels 102 and the battery 250, to receive power from the solar panels 102 and provide power to the battery 250. In general, in various embodiments, charge control circuitry 202 may control charging of a battery 250 from one or more power sources. In some embodiments, charge control circuitry 202 may include output circuitry 212 coupled to ports 108 to control discharging of a battery 250 via the ports 108, to power or recharge other devices. In some embodiments, however, output circuitry 212 may be separate from charge control circuitry 202. Charge control circuitry 202, in some embodiments, may implement logic for controlling maximum and minimum battery voltages, charge rates, battery temperature, and the like, and may include discrete electrical components, special-purpose logic hardware such as one or more application-specific integrated circuits 208 ("ASICs"), general purpose logic hardware such as a microprocessor executing code, or the like.

In the depicted embodiment, the charge control circuitry 202 is configured to control power flow from the solar panels 102 to the battery 250 based on one or more predetermined characteristics of the solar panels 102. A characteristic of a solar panel 102, in various embodiments, may be any attribute, property, or set of attributes or properties that can be measured or otherwise determined for a solar panel 102. For example, a characteristic of a solar panel may be a current-voltage curve under a particular set of operating conditions (e.g., at a particular level of illumination), a set of current-voltage curves under different operating conditions (e.g., at multiple levels of illumination), a power-voltage curve or set of curves, a maximum or open-circuit voltage under some operating condition or set of operating conditions, a maximum or short-circuit current under some operating condition or set of operating conditions, a load or resistance that maximizes power output under certain operating conditions, or the like. One (non-exhaustive) example of solar panel characteristics is discussed below with reference to FIG. 3.

Figure 3:
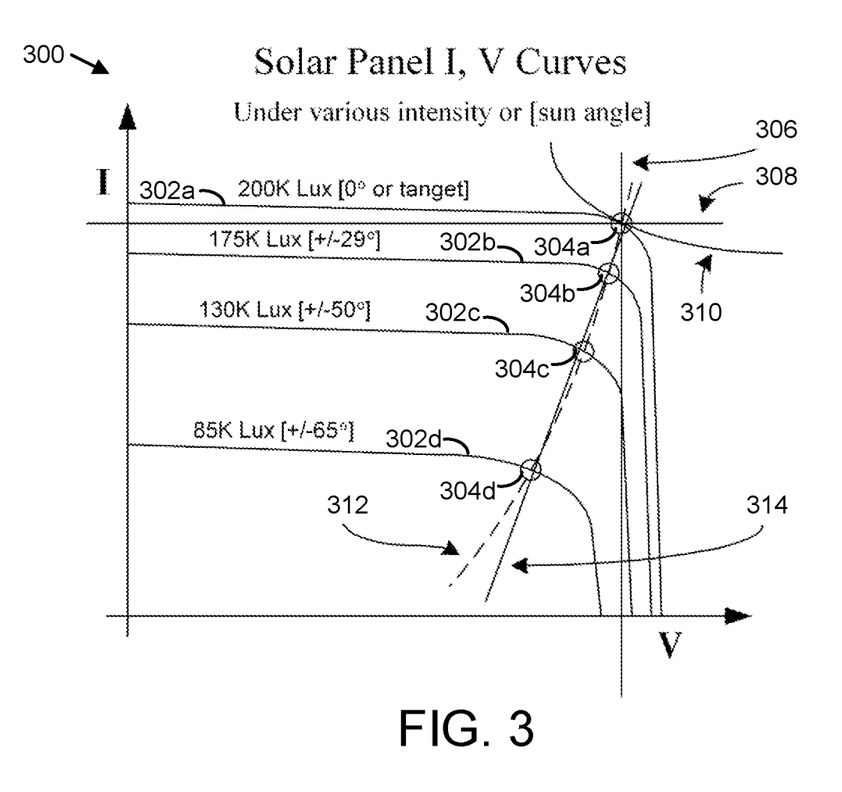
FIG. 3 is a graph showing current-voltage curves for solar panels, in one embodiment.

In FIG. 3, a graph 300 depicts multiple current-voltage curves 302 for solar panels 102 illuminated at different intensities (e.g., at different sun angles corresponding to different latitudes or seasons of the year). Maximum power points 304 are marked on the current-voltage curves 302. A DC-to-DC power converter that receives direct current ("DC") power from solar panels 102 and outputs DC power to charge the battery 250 may be controlled by the charge control circuitry 202, which may control parameters such as the amount of current drawn by the DC-to-DC power converter, the voltage drop across the inputs of the DC-to-DC power converter, or the like. The "virtual" resistance of the DC-to-DC power converter, or the ratio of input voltage to input current (e.g., the ratio of output voltage to output current for the solar panel(s) 102) may be non-constant, and may be controlled by the charge control circuitry 202 based on characteristics of the solar panels 102.

By varying the virtual resistance or load across a solar panel 102 under an otherwise fixed set of operating conditions (e.g., at a fixed illumination level), a current-voltage curve 302 may be obtained where a point on the current-voltage curve 302 represents the voltage across the load and the current through the load. The product of the current and voltage is the power drawn from the solar panel 102 by the load. It may be seen from the graph 300 that available power decreases with decreasing illumination, but that for a fixed level of illumination the current in a current-voltage curve 302 starts at a maximum level, decreases slowly with increasing voltage, and then falls off more steeply after a certain voltage.

At the left-most point on a current-voltage curve 302, a short-circuit or zero-resistance load maximizes the output current from a solar panel 102, but does not produce any voltage drop across the load and therefore draws no power. Increasing the virtual resistance of the load from this point increases the voltage drop across the load and only slightly decreases the current, thus increasing the power output of the solar panel 102. In other words, across a certain range of virtual resistances, the solar panel 102 functions as a current source so that power output increases with increasing resistance. As the virtual resistance increases further, however, the current produced by the solar panel 102 falls off more steeply and power output decreases, until at the right-most point on a current-voltage curve 302, an open-circuit or infinite-resistance load maximizes the output voltage from the solar panel 102, but draws no current and therefore draws no power.

Accordingly, the maximum power point 304 on a current-voltage curve 302 is approximately at the "knee" of the curve, where the output current and output voltage are both high and the power (the product of current and voltage) is maximized. However, because current-voltage curves 302 for a solar panel 102 depend on the illumination level, a load that draws maximum power from the solar panel 102 at one illumination level may draw much less power than the solar panel 102 is capable of producing at another illumination level.

A variety of load curves 306, 308, 310, 312, 314, are depicted on the graph 300. For a given virtual load, the current drawn from the solar panel 102 at a particular voltage is represented as a point on the graph 300, so that the set of such points forms a load curve showing the current drawn by virtual load across a range of voltages. As described above, the actual load may be a DC-to-DC power converter, that acts as a load from the perspective of the solar panel(s) 102, but as a power source from the perspective of the battery 250. A load curve intersects a current-voltage curve 302 for a solar panel 102 at the voltage where the current provided by the solar panel 102 matches the current drawn by the load. Thus, the power output for a solar panel 102 coupled to a load may be determined by the product of current and voltage at the point where the current-voltage curve for the solar panel 102 under its operating conditions intersects the current-voltage curve for the load.

However, some load curves may result in inefficient power usage. Load curve 310 is a constant power curve intersecting the maximum power point 304a for full illumination (current-voltage curve 302a). At full illumination of the solar panel 102, maximum power will be transferred to the load. At lower illumination, however, no power will be transferred as the load curve 310 does not intersect the lower-illumination current-voltage curves 302b-d. A constant voltage load curve 306 or a constant current load curve 308 may similarly intersect the maximum power point 304a for a full illumination solar panel 102, but may be inefficient at lower illuminations where the constant voltage curve 306 results in sharply reduced or zero current, and the constant current curve 308 results in sharply reduced or zero voltage.

An ideal load curve 312 would intersect the maximum power points 304 for all of the current-voltage curves 302 of a solar panel 102 under different conditions. Load curve 314 represents a linear approximation to the ideal load curve 312. The virtual load presented to the solar panel 102 by a power converter controlled in accordance with load curve 314 is equivalent to a fixed resistance in series with a fixed voltage.

Various methods of power point tracking (sometimes referred to as "maximum power point tracking") exist for controlling power output from one or more solar panels 102 (e.g., by controlling power input to a DC-to-DC power converter), to approximate or track the maximum power points 304 on multiple current-voltage curves. Some implementations of power-point tracking may themselves require significant amounts of power, and are therefore most beneficial for large solar panels or arrays where the amount of available power is high. For example, a processor that executes code to periodically adjust or perturb the amount of current drawn by a load and determine whether the power output of a solar panel 102 increases or decreases may itself draw several watts, and may not be suitable for smaller portable or handheld solar battery packs that only generate a few watts. However, in some embodiments, power-point tracking using a low-power ASIC and/or using predetermined characteristics of the solar panels 102 may provide the benefits of power-point tracking even in a portable or handheld solar battery pack apparatus 100.

Referring back to FIG. 2, the charge control circuitry 202 includes first input circuitry 204 for charging the battery 250 from the solar panel(s) 102. The first input circuitry 204 is configured to control power flow from the solar panels 102 to the battery 250 based on one or more predetermined characteristics of the solar panels 102. In various embodiments, various characteristics of solar panels 102, such as current-voltage curves 302, maximum power points 304, or the like, may be predetermined by the manufacturer or supplier of an apparatus 100. Manufacturing multiple apparatuses 100 using the same type of solar panels 102 (e.g., solar panels from the same supplier, solar panels of the same design or the like) may result in solar panels 102 having known characteristics across multiple apparatuses, so that power point tracking can be done based on those known characteristics rather than by using larger amounts of computational power to seek a maximum power point. For example, controlling power flow based on known or predetermined characteristics of solar panels 102 may include implementing a load curve 314 that intersects or approximates predetermined maximum power points 304. As another example, controlling power flow based on known or predetermined characteristics of solar panels 102 may include periodically determining an illumination level based on known current-voltage curves 302 for the solar panels 102, then controlling power flow to match or approximate a maximum power point 304 for the given illumination level.

In the depicted embodiment, the first input circuitry 204 includes a DC-to-DC power converter 206 and an ASIC 208. The DC-to-DC power converter 206 in the depicted embodiment can be controlled to convert a voltage from the solar panels 102 up or down to a voltage for charging the battery 250. For example, although the voltage produced by a solar panel 102 may vary depending on illumination and load, and the voltage used to charge the battery 250 may vary depending on the battery's current state of charge, the solar panel 102 under full illumination may be capable of producing voltages too high for charging the battery 250, and these voltages therefore may be stepped down to a desired battery charge voltage by the DC-to-DC power converter 206. In various embodiments, a DC-to-DC power converter 206 may be a buck converter, a boost converter, a buck-boost converter (inverting or four-switch), a split-pi converter, a auk converter, a single-ended primary-inductor converter (SEPIC) converter, a transformer-based converter or the like. Various converter topologies may be suitable in different embodiments, depending on the range of voltages produced by the solar panels 102 and the range of voltages used for charging the battery 250.

The DC-to-DC power converter 206 in the depicted embodiment is one type of switched-mode power converter. In switched-mode power converters, at least one component such as an inductor, a transformer, or a capacitor is capable of storing energy in a magnetic or electric field and releasing the stored energy via an output current, and switching at the input and/or the output of the energy-storing component transforms power in one form (e.g., at an input voltage and current point) to power in another form (e.g., with higher voltage and lower current, or with lower voltage and higher current). The use of a switched mode DC-to-DC power converter 206 may be much more efficient than using a linear regulator that dissipates power to step down a voltage.

The DC-to-DC power converter 206 in the depicted embodiment is controlled by the ASIC 208. In some embodiments, an ASIC 208 is configured to control the DC-to-DC power converter 206 based on one or more predetermined characteristics of the solar panels 102, as described above. Various ASICs 208 are commercially available for controlling DC-to-DC power converters 206, with a variety of power sources. In some embodiments, controlling power flow based on known or predetermined characteristics of solar panels 102 may include calibrating an ASIC 208 to control a DC-to-DC power converter 206 based on those characteristics, such as by tracking known maximum-power points, using a predetermined load curve or the like.

In some embodiments, an ASIC 208 or other charge control circuitry 202 may be configured to limit an output current for the solar panels 102 in response to an output voltage for the solar panels failing to satisfy a threshold, where the threshold is based on the one or more predetermined characteristics of the solar panels. For example, an ASIC 208 may be configured to control the DC-to-DC power converter 206 to draw a constant current (e.g., load curve 308) corresponding to the maximum-power point 304 on a current-voltage curve 302 for maximum illumination, typical expected illumination, or the like (which may be one predetermined characteristic of the solar panels 102), but may also be configured to reduce the current if the voltage falls below a threshold. The target current and/or the voltage threshold for reducing the current draw below the target may be based on predetermined characteristics of the solar panels such as the maximum power point 304, maximum current, and/or maximum voltage for one or more current-voltage curves 302.

In some embodiments, an ASIC 208 for controlling a DC-to-DC power converter 206 may use much less power than an equivalent general-purpose processor, and thus may provide the benefits of power-point tracking even in a small handheld or portable solar battery pack apparatus 100 with a nominal power of under 5 watts. Additionally, in some embodiments, a single-cell lithium-ion battery 250 may have a maximum voltage of 4.2 volts, and an actual output voltage significantly less than the maximum voltage, depending on the battery's state of charge. However, in some embodiments, the supply voltage used (or required) by the charge control circuitry 202 including the ASIC 208 may be higher than the battery output voltage. Thus, in some embodiments, the charge control circuitry 202 and/or the ASIC 208 may be solely powered by the solar panels 102, and not by the battery 250. Powering the charge control circuitry 202 directly from the solar panels 102 may result in the charge control circuitry 202 being unpowered or unavailable in low-light conditions, but may provide the benefits of power-point tracking in a small or handheld apparatus 100 with a single-cell battery 250. By contrast, powering certain ASICs from the battery 250 may increase complexity of an apparatus 100 by using multiple-cell batteries to provide a sufficiently high supply voltage.

In the depicted embodiment, the charge control circuitry 202 includes second input circuitry 210 for charging the battery 250 from an external power source. External power may be provided via one or more of the ports 108. Second input circuitry 210 may include components such as a DC-to-DC power converter for charging from a DC power source, an AC-to-DC power converter for charging from an alternating current ("AC") power source, or the like. The charge control circuitry 202 may independently control the first input circuitry 204 and the second input circuitry 210 to charge the battery 250 using the solar panels 102 and the external power source simultaneously. For example, independently controlling power converters in the first input circuitry 204 and the second input circuitry 210 may allow the apparatus 100 to charge the battery 250 from the solar panels 102 alone, the external power source alone, or simultaneously from both the solar panels and the external power source (by controlling both power converters to output the same battery-charging voltage in parallel).

Providing a solar battery pack capable of simultaneous solar and external charging may, in some embodiments, allow a user in a central location where external power is available to rapidly recharge the apparatus 100 or exchange a discharged apparatus 100 for a fully charged apparatus. The user may then use the apparatus 100 to power or recharge the user's personal electronic devices at an off-grid location where external power is not available, and may recharge the apparatus 100 using solar power alone one or more times while "off-grid." Charging the apparatus 100 using solar power alone may be slower than when also using an external power source, but may allow for extended off-grid use without returning to a location where external power is available. Additionally, an apparatus with high-efficiency solar panels 102 and power-point tracking based on predetermined characteristics of the panels 102 may fully charge a battery over the course of a day, where other solar battery packs without power point tracking may take significantly longer to charge the same battery. For example, in one embodiment, under ideal lighting conditions, two 1.5 watt solar panels 102 may fully charge a 6,000 mAh battery 250 over the course of nine hours.

Output circuitry 212, in the depicted embodiment, is electrically coupled to the battery 250 and to one or more output connectors (e.g., some or all of the ports 108) to control power flow from the battery through the output connectors. Output circuitry 212, in various embodiments, may include components to prevent over-discharging the battery 250, temperature control components, one or more DC-to-DC power converters to step a battery voltage up or down to a desired output voltage, or the like. In some embodiments, output circuitry 212 may be capable of delivering power from the battery 250 through the output connectors while the battery 250 is being charged. For example, providing separate, independently controlled power converters in the input circuitry 204, 210 and the output circuitry 212 may allow the apparatus 100 to power an external device while the battery 250 while the battery is being charged.

In some embodiments, output circuitry 212 may include circuitry and/or components to support a standard for power output. For example, where ports 108 include USB-A ports, output circuitry may be configured to provide standard power levels for USB-A connections. In some embodiments, output circuitry 212 may be "quick charge" output circuitry configured to negotiate voltage and current between devices for faster charging of devices that support a quick charge protocol. Some examples of quick charge protocols include various protocols under the Qualcomm Quick Charge trademark, such as Quick Charge 2.0, Quick Charge 2.0, and the like. Various other or further quick charge protocols that provide for negotiated power output levels may be supported by output circuitry 212.

Figure 4:
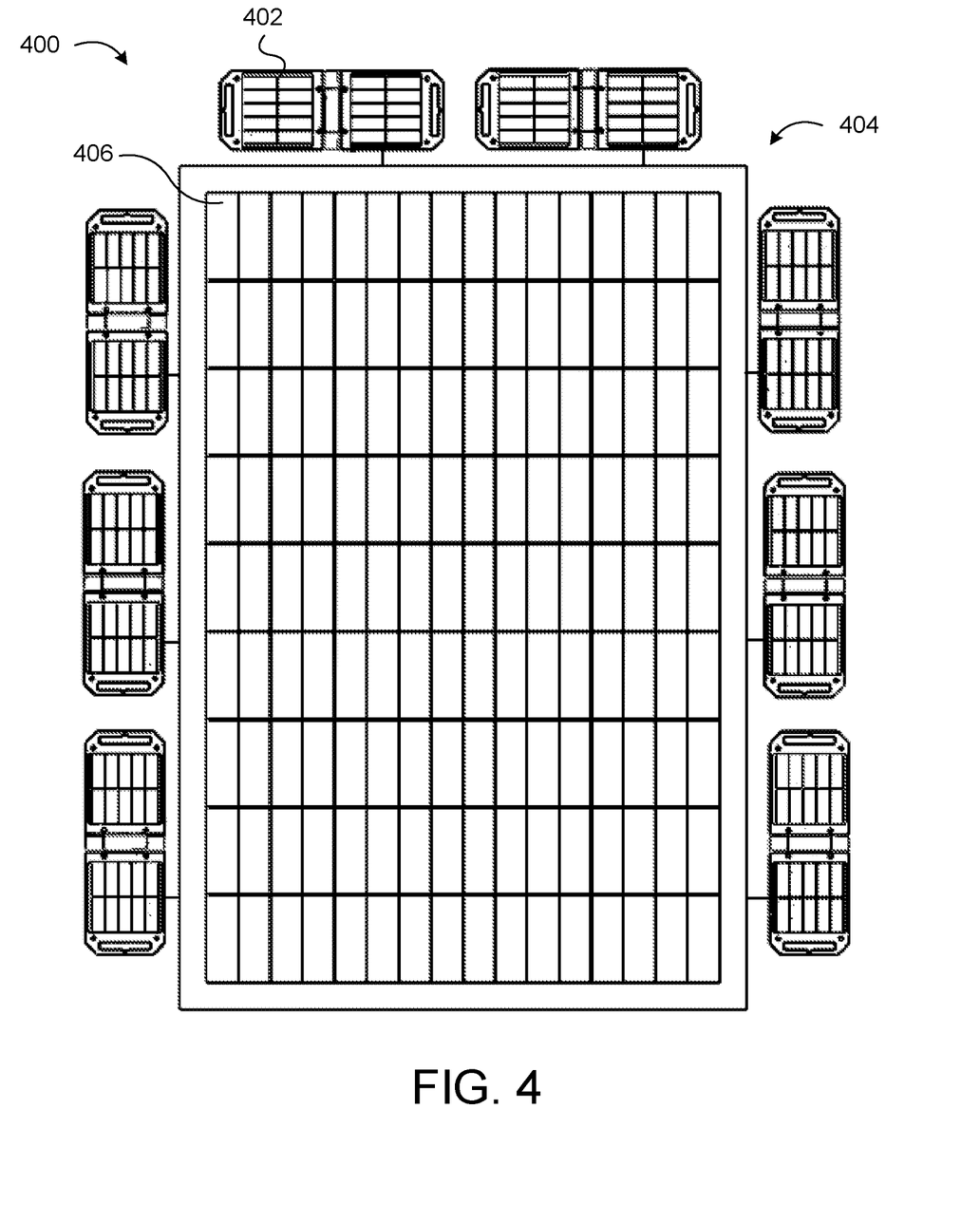
FIG. 4 is a top view illustrating one embodiment of a system for solar-powered battery charging.
Figure 5:
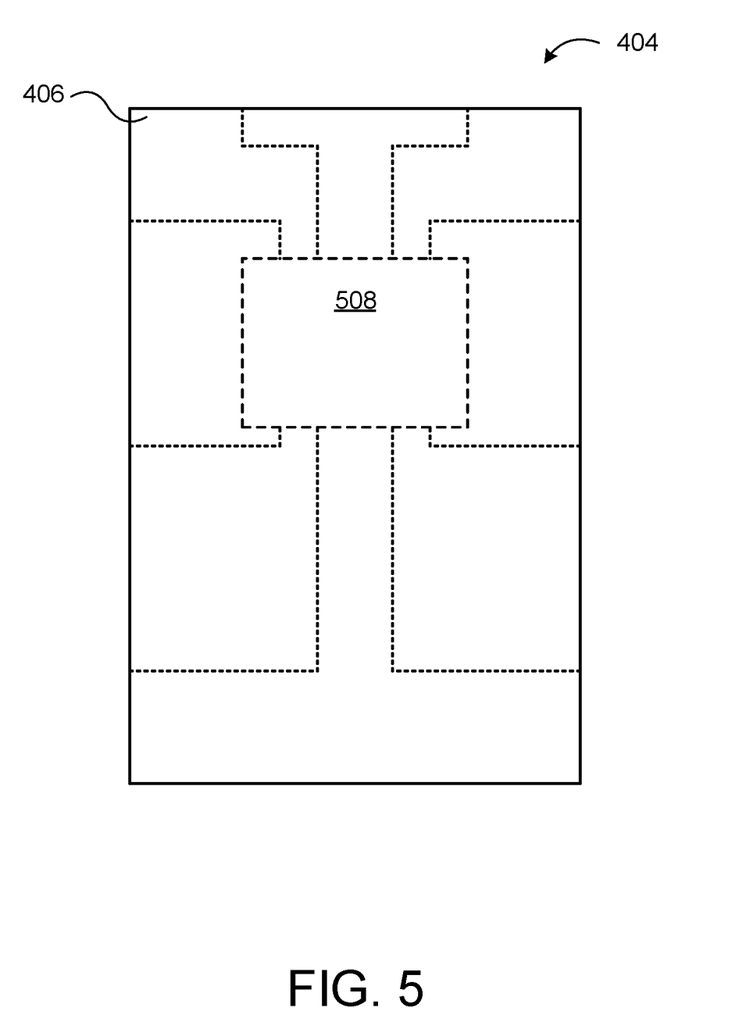
FIG. 5 is a schematic block diagram illustrating one embodiment of a charging station.

In some embodiments, an apparatus 100 for solar battery charging may include a charging station separate from the housing 104. Similarly, in some embodiments, systems for solar battery charging may include a charging station, with one or more solar battery packs. FIG. 4 depicts one embodiment of a system 400 for solar-powered battery charging, including a charging station 404, and FIG. 5 depicts a schematic block diagram of the charging station 404, including components that are not visible in FIG. 4. In the depicted embodiment, the system 400 includes a charging station 404 and a plurality of solar battery packs 402. The solar battery packs may be substantially similar to the apparatus 100 described above with reference to FIGS. 1-3, including one or more solar panels and a battery, coupled to a foldable housing.

The charging station 404, in the depicted embodiment, includes a solar panel 406 for the charging station, and a quick charge controller 508 (shown in FIG. 5) with multiple power outlets. In the FIG. 5, the solar panel 406 occupies the front surface of the charging station 404, and dashed lines represent components behind the solar panel (e.g., on the back surface), including the quick charge controller 508. Solar panels for the solar battery packs 402 may be smaller than the solar panel 406 for the charging station 404. For example, in one embodiment, the solar panel 406 for the charging station 404 may have a nominal power of at least 100 watts, and therefore may be significantly larger than the solar panels for a solar battery pack 402, with a combined nominal power of 5 watts or less. In various embodiments, a solar panel 406 for the charging station 404 may have a nominal power of at least 50 watts, at least 100 watts, at least 150 watts, at least 200 watts, at least 250 watts, or more.

The multiple power outputs for the charging station 404, represented by dashed lines coupled to the quick charge controller 508, may include USB-A ports, USB-C ports, Micro USB ports, 12 volt cigarette lighter connectors, or the like. The solar battery packs 402 may include first input circuitry and second input circuitry as described above with reference to FIG. 2, where the first input circuitry is configured for charging a battery from solar panel(s) and the second input circuitry is configured for charging the battery from an external power source, which may be one of the multiple power outlets for the charging station 404.

The quick charge controller 508 may include quick charge output circuitry that supports a quick charge protocol as described above, and the charge control circuitry for the solar battery packs 402 may include quick charge input circuitry for charging a battery from the quick charge controller 508. For example, the second input circuitry, for charging from an external power source, may be quick charge input circuitry. As described above, quick charge input circuitry for a device receiving power and corresponding quick charge output circuitry for a device providing power may both include communication circuitry for negotiating voltage and current between devices, according to one or more quick charge protocols such as Qualcomm Quick Charge 2.0, Quick Charge 3.0 or the like.

In the depicted embodiment, multiple solar battery packs 402 may be coupled to the charging station 404 simultaneously, via multiple power outputs of the charging station 404. With the solar battery packs 402 unfolded as depicted in FIG. 4, the solar battery packs may be simultaneously charged by their own solar panels and the charging station 404. Although FIG. 4 depicts solar battery packs 402 connected to the charging station 404, other devices such as phones or tablets may be connected to and directly charged from the charging station 404 in some embodiments In some embodiments, the quick charge controller 508 may be configured to control power flow from the solar panel 406 for the charging station 404 to the multiple power outlets (and to the connected devices 402) based on power point tracking of the solar panel for the charging station. Various forms of power point tracking (sometimes referred to as maximum power point tracking) are described above with reference to FIGS. 2 and 3. Power point tracking may be based on direct observation of a current-voltage curve or a power-voltage curve, and/or based on predetermined characteristics of the solar panel 406 such as known maximum power points.

In some embodiments, a charging station 404 with a 100 watt solar panel 406 may have available power to provide power point tracking that is more sophisticated than the calibrated power point tracking described above for a low-power handheld apparatus. In some embodiments, a quick charge controller 508 may include logic hardware such as a processor executing code for power point tracking and other quick charge functions, one or more application-specific integrated circuits, or the like. In some embodiments, the combination of a charging station 404 that uses power point tracking to control power flow from a large solar panel 406, and solar battery packs 402 that control power flow from smaller solar panels to a battery based on predetermined solar panel characteristics, may provide more efficient charging of multiple batteries than if power point tracking is used at only the charging station level or only the solar battery pack level.

In the depicted embodiment, the quick charge controller 508 is coupled to the back of the solar panel 406 for the charging station 404, allowing the charging station 404 to be used and moved as a single, portable unit. Using a portable charging station 404 and multiple solar battery packs 402, a person may create a sustainable business in off-grid communities. By using financing options or pay-as-you-go payment methods, people may sell or lease solar battery packs 402 and also offer a quick charging service using the charging station 404 to accompany the purchase or lease of a solar battery pack 402. Solar battery pack users may quick charge their solar battery packs 402 in 2 to 3 hours at the charging station 404 compared to 1 to 3 days without external power. Users also have the option avoid waiting for recharging, by swapping out a "dead" or discharged solar battery pack 402 at an agent's recharging station 404 to receive a fully charged solar battery pack 402 that has been previously charged.

Users that lease or own a solar battery pack 402 may also charge their friends and/or neighbors' phones to generate revenue. By using the solar battery pack 402 to generate personal income, users may subsidize or fully pay for their purchase or lease or a solar battery pack 402. Similarly, people that purchase or lease a system 400 including the charging station 404 and multiple solar battery packs 402 may generate business income to subsidize or fully pay for the system 400.

Figure 6:
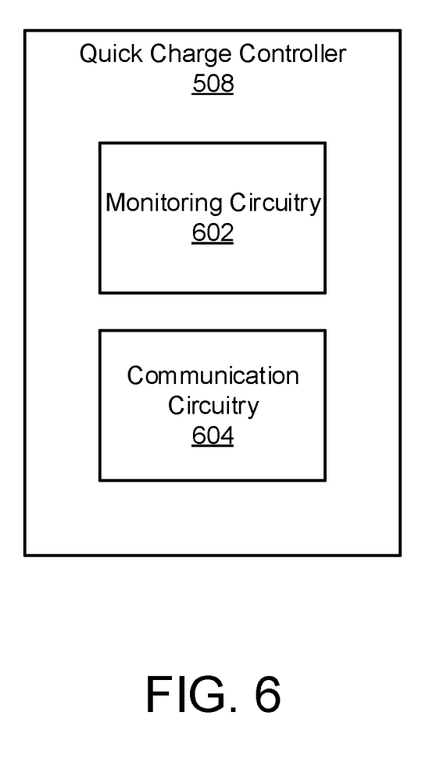
FIG. 6 is a schematic block diagram illustrating one embodiment of a quick charge controller.

FIG. 6 is a schematic block diagram illustrating one embodiment of a quick charge controller 508, which may be substantially as described above with reference to FIGS. 4 and 5. Additionally, in the depicted embodiment, the quick charge controller 508 includes monitoring circuitry 602 and communication circuitry 604. The monitoring circuitry 602, in the depicted embodiment, is configured to monitor illumination of the solar panel 406 for the charging station 404. Monitoring illumination may include measuring an output such as an open circuit voltage, maximum current, or the like for a solar panel, and comparing the measured output to known illumination curve. Illumination may be measured or monitored in various other or further ways. Communication circuitry 604 may be configured to present information to a user to facilitate positioning the solar panel 406 for the charging station 404 based on the illumination. For example, communication circuitry 604 may include a display, or a wired or wireless transmitter to connect to a user's device such as a phone to display information. Information to facilitate positioning the solar panel 406 may include a direct measurement of illumination, allowing the user to find a position or angle for the solar panel 406 by trial and error, or may include instructions for changing the angle of the solar panel 406 to first make one or more illumination measurements then position the solar panel for high illumination.

In some embodiments, communication circuitry 604 may be configured to determine state of charge information for solar battery packs 402 connected to the power outlets of the charging station 404, and to present the state of charge information to a user (e.g., via a display or via communication with another device for the user). Determining state of charge information for a solar battery pack 402 may include communicating with charge control circuitry for the solar battery pack 402, or directly measuring a battery voltage for the solar battery pack. In some embodiments, using a charging station 404 as a central point for monitoring the charge state of multiple solar battery packs 402 may facilitate efficient recharging of multiple solar battery packs 402.

Figure 7:
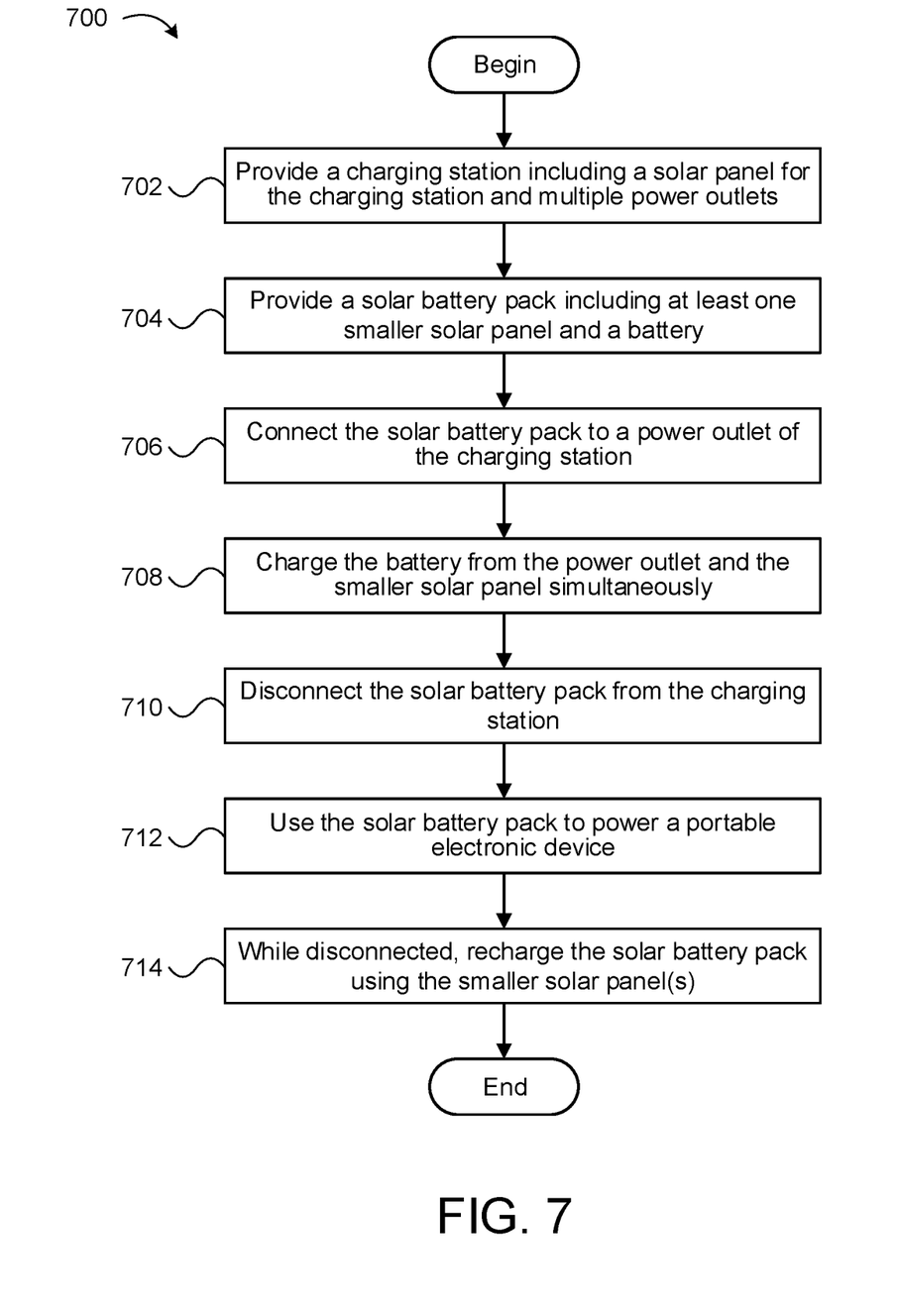
FIG. 7 is a schematic flow chart diagram illustrating one embodiment of a method for solar-powered battery charging.

FIG. 7 is a schematic flow chart diagram illustrating one embodiment of a method for solar-powered battery charging. The method 700 begins, with providing 702 a charging station 404 that includes a solar panel 406 for the charging station 404, and a quick charge controller 508 with multiple power outlets. The method 700 further includes providing 704 a solar battery pack 402 that includes at least one solar panel smaller than the solar panel 406 for the charging station 404 and coupled to a foldable housing, a battery coupled to the housing, and charge control circuitry for charging the battery. The method 700 further includes connecting 706 the solar battery pack 402 to a power outlet of the multiple power outlets. The method 700 further includes charging 708 the battery from the power outlet and the at least one solar panel simultaneously. The method 700 further includes disconnecting 710 the solar battery pack 402 from the charging station 404. The method 700 further includes using 712 the solar battery pack 402 to power a portable electronic device. For example, the solar battery pack 402 may supply power to a phone, a tablet, or another type of device.

The method 700 further includes recharging 714 the solar battery pack 402 using the at least one solar panel (e.g., its own smaller solar panels) while the solar battery pack 402 is disconnected from the charging station 404 (with its larger solar panel). In some embodiments, a method may include using 712 and recharging 714 a solar battery pack 402 multiple times using its own smaller solar panels, without reconnecting to the charging station 404. In some embodiments, a method may include reconnecting 706 the solar battery pack 402 to the charging station 404 for faster recharging.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   at least one solar panel coupled to a foldable housing;
   at least one battery coupled to the housing; and
   charge control circuitry electrically coupled to the at least one solar panel and the at least one battery, the charge control circuitry configured to control power flow from the at least one solar panel to the at least one battery based on one or more predetermined characteristics of the at least one solar panel, wherein the charge control circuitry comprises first input circuitry for charging the at least one battery from the at least one solar panel and second input circuitry for charging the at least one battery from an external power source, the charge control circuitry configured to independently control each of the first and second input circuitry such that the at least one battery can be charged using the at least one solar panel and the external power source simultaneously, the charge control circuitry prioritizing charging the at least one battery from the at least one solar panel over the at least one battery, the one or more predetermined characteristics of the at least one solar panel comprising a known current-voltage curve, a known maximum power point, or a combination thereof.

2. The apparatus of claim 1, wherein the charge control circuitry comprises a
   a DC-to-DC power converter to step down a voltage from the at least one solar panel to a voltage for charging the at least one battery; and
   an application-specific integrated circuit configured to control the DC-to-DC power converter based on the one or more predetermined characteristics of the at least one solar panel.

3. The apparatus of claim 1, wherein a combined nominal power of the at least one solar panel is less than five watts.

4. The apparatus of claim 1, wherein an output voltage for the at least one battery is less than five volts.

5. The apparatus of claim 1, wherein a supply voltage for the charge control circuitry is higher than an output voltage of the at least one battery, and the charge control circuitry is solely powered by the at least one solar panel.

6. The apparatus of claim 1, wherein the charge control circuitry is configured to limit an output current for the at least one solar panel in response to an output voltage of the at least one solar panel failing to satisfy a threshold, the threshold based on the one or more predetermined characteristics of the at least one solar panel.

7. The apparatus of claim 1, comprising one or more output connectors, and output circuitry that controls power flow from the at least one battery through the one or more output connectors.

8. The apparatus of claim 7, wherein the output circuitry is capable of delivering power from the at least one battery through the one or more output connectors while the at least one battery is being charged.

9. The apparatus of claim 1, further comprising a charging station separate from the housing, the charging station comprising:
   a different solar panel for the charging station; and
   a quick charge controller with multiple power outputs.

10. The apparatus of claim 9, wherein the charge control circuitry comprises quick charge input circuitry for charging the at least one battery from the quick charge controller of the charging station.

11. The apparatus of claim 9, wherein the nominal power for the at least one solar panel for the charging station is at least one hundred watts.

12. A system comprising:
    a charging station, the charging station comprising:
       a solar panel for the charging station; and
       a quick charge controller with multiple power outlets; and
    a plurality of solar battery packs, wherein each of the solar battery packs comprises:
       at least one solar panel smaller than the solar panel for the charging station and coupled to a foldable housing;
       at least one battery coupled to the housing; and
       charge control circuitry electrically coupled to the at least one solar panel and the at least one battery, the charge control circuitry comprising first input circuitry for charging the at least one battery from the at least one solar panel and second input circuitry for charging the at least one battery from a power outlet of the multiple power outlets, the charge control circuitry configured to independently control each of the first and second input circuitry such that the at least one battery can be charged using the two solar panels and the external power source simultaneously.

13. The system of claim 12, wherein the charge control circuitry is configured to control the first input circuitry and the second input circuitry to charge the battery using the at least one solar panel and the power outlet simultaneously.

14. The system of claim 12, wherein:
    the charge control circuitry is configured to control power flow from the at least one solar panel to the battery based on one or more predetermined characteristics of the at least one solar panel; and
    the quick charge controller is configured to control power flow from the solar panel for the charging station to the multiple power outlets based on power point tracking of the solar panel for the charging station.

15. The system of claim 12, wherein the quick charge controller is coupled to the back of the solar panel for the charging station, for moving the charging station as a single, portable unit.

16. The system of claim 12, wherein the quick charge controller comprises monitoring circuitry configured to monitor illumination of the solar panel for the charging station, and communication circuitry configured to present information to a user to facilitate positioning the solar panel for the charging station based on the illumination.

17. The system of claim 12, wherein the quick charge controller comprises communication circuitry configured to determine state of charge information for solar battery packs connected to the power outlets, and to present the state of charge information to a user.

18. A method comprising:
- providing a charging station comprising a solar panel for the charging station, and a quick charge controller with multiple power outlets;
- providing a solar battery pack comprising at least one solar panel smaller than the solar panel for the charging station and coupled to a foldable housing, at least one battery coupled to the housing, and charge control circuitry for charging the at least one battery, wherein the charge control circuitry comprises first input circuitry for charging the at least one battery from the at least one solar panel and second input circuitry for charging the at least one battery from an external power source, the charge control circuitry configured to independently control each of the first and second input circuitry such that the at least one battery can be charged using the at least one solar panel and the external power source simultaneously;
- connecting the solar battery pack to a power outlet of the multiple power outlets;
- charging the at least one battery from the power outlet and the at least one solar panel simultaneously;
- disconnecting the solar battery pack from the charging station;
- using the solar battery pack to power a portable electronic device; and
- recharging the solar battery pack using the at least one solar panel while the solar battery pack is disconnected from the charging station.

* * * * *